Oct. 13, 1936.　　　　A. W. KEEN　　　　2,057,032
APPARATUS AND METHOD FOR CONTROLLING FLOW OF FLUID MATERIALS
Filed Nov. 16, 1934　　　4 Sheets-Sheet 1

Fig. 1.

INVENTOR
ALEXIS W. KEEN
BY
ATTORNEY

Oct. 13, 1936.                A. W. KEEN                2,057,032
         APPARATUS AND METHOD FOR CONTROLLING FLOW OF FLUID MATERIALS
                      Filed Nov. 16, 1934        4 Sheets-Sheet 2

INVENTOR
ALEXIS W. KEEN
BY
ATTORNEY

Oct. 13, 1936.    A. W. KEEN    2,057,032
APPARATUS AND METHOD FOR CONTROLLING FLOW OF FLUID MATERIALS
Filed Nov. 16, 1934    4 Sheets-Sheet 3

INVENTOR
ALEXIS W. KEEN
BY
ATTORNEY

Oct. 13, 1936.  A. W. KEEN  2,057,032
APPARATUS AND METHOD FOR CONTROLLING FLOW OF FLUID MATERIALS
Filed Nov. 16, 1934   4 Sheets-Sheet 4

INVENTOR
ALEXIS W. KEEN
ATTORNEY

Patented Oct. 13, 1936

2,057,032

UNITED STATES PATENT OFFICE 2,057,032

APPARATUS AND METHOD FOR CONTROLLING FLOW OF FLUID MATERIALS

Alexis W. Keen, Passaic, N. J., assignor to United States Rubber Company, New York, N. Y., a corporation of New Jersey Application November 16, 1934, Serial No. 753,311

18 Claims. (Cl. 18—8)

This invention relates to apparatus and method for controlling the flow of fluid material, and more particularly to the manufacture of articles of constant form by the flowing of a fluid material which is subject to changes in property which vary the flow characteristics of the material, such as in the manufacture of rubber thread of constant size by supplying a stream of latex to a thread forming device.

The production of rubber thread, which term is intended to include solid rubber thread, hollow rubber thread or tubing, flat or other shaped rubber tape or ribbon, by flowing or streaming latex under pressure through an orifice of the desired size and shape into a coagulant for the latex and removing the filamentary coagulum to subsequent operations such as drying, vulcanizing and talcing for preparation into finished thread, is well known, and is described in patents to Hopkinson No. 1,545,257; Gibbons and Hazell No. 1,832,012; Gibbons, Hazell and Keen No. 1,947,080; and Keen No. 1,947,090. The usual method for controlling the continuous flow of fluids by means of metering pumps run at constant speeds, as is commonly used in the spinning of cellulose and similar threads, is wholly inapplicable to controlling the flow of latex. The use of metering pumps with fluids such as latex is impossible since latex and its compounds rapidly coagulate on close fitting gears and valves and jam them, and in addition, metering pumps are subject to inaccuracies due to wear and hence over a period of time will produce thread of varying sizes.

In the manufacture of rubber threads from latex as above described and with fixed nozzles or spinerets, the size of the thread will vary as (1) the rate of withdrawal of the filamentary coagulum, (2) the pressure or head of latex, (3) the specific gravity of latex, and (4) the viscosity of latex. The rate of withdrawal of the filamentary coagulum may be readily maintained constant as by a constant speed take-off roll or belt for the filament. The pressure or head of latex may be maintained constant by various means such as constant pressure feed tanks or feed buckets suspended on a spring for maintaining the hydrostatic head constant, as shown in the above mentioned patents. The specific gravity of the same latex composition does not appreciably vary with the changes in temperature normally encountered from time to time in manufacturing operations. The viscosity of the latex, however, does vary considerably with changes in temperature and to some extent with the age of the latex and these changes in the viscosity which necessarily vary the flow characteristics of the latex are sufficient to materially vary the size of the thread produced when the other factors, such as nozzles, rate of withdrawal of the formed filaments, pressure or head of latex, and specific gravity of latex are maintained substantially constant. By the present invention, the effect of changes in the viscosity of the latex is overcome, and the production of rubber thread of a constant size by flowing latex through an orifice is made possible despite variations in the flow characteristics of the latex.

The present invention relates more particularly to the manufacture of articles of constant form produced by the flowing of a fluid material which is subject to changes in property which act to vary the flow characteristics of the material. The variations in the flow characteristics of the material itself whether produced by variations primarily in the viscosity of the material, as in the case of latex, or by changes in other properties, such for example as surface tension or osmotic pressure, are automatically counterbalanced so that the article produced by the flowing of the material is of constant form despite the variations in the flow characteristics of the material which would normally tend to vary the form of the article produced. In its broader aspect, the invention relates to controlling the flow of any liquid, and is particularly adapted to controlling the flow of liquids which cannot be pumped or metered in the usual way.

In describing the particular exemplification of the invention in the above referred manufacture of rubber thread, reference will be had to the accompanying drawings, in which.

According to the present invention, the effects of variations in the flow characteristics of the fluid material are automatically counterbalanced to produce articles of a constant form. In order to maintain constant the form or size of articles produced by the flowing of a fluid material, it is necessary to keep constant the ratio of the input or rate of consumption of the material to the out-put or rate of production of the articles. Naturally, if more or longer articles are produced from the same weight of material at one time than at another, or if it takes more material to produce the same number or same length of articles, the articles produced at such different times are not of the same form or size. The present invention seeks to maintain constant the form of the articles produced by comparing the rate of consumption of the fluid material with the rate of production of the articles and if the ratio of the two varies from a predetermined standard which is known or calculated to produce the correct form of article, then to automatically vary either the rate of consumption or rate of production so as to correct the variation of the ratio from the standard. There are various methods of comparing the rate of consumption of the fluid material with the rate of production of the articles and for varying one or the other rate to maintain the ratio constant at a predetermined standard, and these will be illustrated in connection with the exemplified process of rubber thread manufacture.

In the specific process for manufacturing rubber thread illustrated in the drawings, latex is streamed or extruded under a hydrostatic head, through nozzles into a coagulant and the filamentary coagula are removed from the coagulant by a constant speed pull-roll onto a travelling belt for finishing operations such as drying, vulcanizing and the like. The latex is fed from an intermittently filled bucket suspended by a spring mechanism which maintains the hydrostatic head constant by compensating for loss of hydrostatic head due to the consumption of latex. A definite weight of the latex consumed in each emptying of the bucket is used as the standard to compare the length of thread produced or the time it takes such thread to be produced from such an amount of latex. This weight-measuring mechanism is coordinated with a length-measuring or time-measuring instrument for controlling the flow of latex. In the apparatus, there is an instrument for measuring the length of belt passed or the time it takes the belt to pass and therefore the length of thread produced while the definite weight of latex has been used up or the time it takes the definite weight of latex to be used up. If the length of thread corresponding to such a definite weight of latex is greater than a predetermined standard of length for such a weight to give the proper size thread, then a motor controlled by the measuring instrument automatically raises the hydrostatic head of latex in order to increase the pressure head and hence the rate of flow of latex and thereby make a shorter length and larger size of thread from such a weight of latex. Conversely, if the length of thread measured is less than the standard, the motor controlled by the measuring instrument lowers the hydrostatic head to produce less pressure at the nozzles and hence a lower rate of flow of latex and thereby a longer length and smaller size of thread from such definite measured weight of latex.

Another method of comparing the rate of consumption of latex with the rate of production of thread is by measuring the weight of latex consumed for the production of a fixed length of thread or, what amounts to the same thing with a constant speed pull-off roll or belt, the amount of latex consumed in a given time. This is possible by means of a dropper associated with the delivery line and counting the drops with an "electric eye" operating a counting or measuring device through a relay.

Other methods of varying the rate of consumption or rate of flow of the latex to keep constant the ratio of the rate of consumption of latex to the rate of production of thread than raising or lowering the hydrostatic head of latex as described above may be used. For example, a fluid pressure superimposed on the hydrostatic pressure may be varied, and, of course, where the latex is fed from a pressure tank rather than from a hydrostatic head only, the pressure on the latex in the tank itself may be varied with variations in the ratio of rate of consumption to rate of production. As another example, the flow resistance of the delivery line may be varied, for example, by a valve device with a plunger of variable effective length inside a portion of the delivery line. The rate of flow might also be varied to counterbalance variations in the ratio of in-put to out-put by having a stretched rubber tube as part of the delivery line, its diameter being varied by stretching it or relaxing it the desired extent, thus controlling the rate of flow. The viscosity of the latex itself could be varied in the supply line to compensate for viscosity changes in the body of latex supply by varying a heating element surrounding some portion of the supply line and responsive to changes in the ratio of rate of consumption of latex to rate of production of thread.

Instead of varying the rate of consumption of latex to maintain constant the ratio of the rate of consumption of latex to the rate of production of thread, the rate of production of thread may be varied. The simplest method of so varying the rate of production is by altering the speed of the pull-off and belt mechanism according to variations in the ratio of the rate of consumption to rate of production from a predetermined standard. As may be seen there is a large variety of methods for comparing the rate of consumption of latex with the rate of production of thread and for varying either the rate of consumption or rate of production to compensate or correct for changes in the ratio of such rates from a predetermined standard. These various methods have been discussed with respect to the present thread making process, but the principle is readily adaptable for controlling the flow of fluids in operations where it is desired to directly control the weight of material used rather than the volume as in metering pumps and the like, and to various other manufacturing processes where articles are produced by the flowing of a fluid material which is subject to changes in property which act to vary the flow characteristics of the material.

Figure 1:
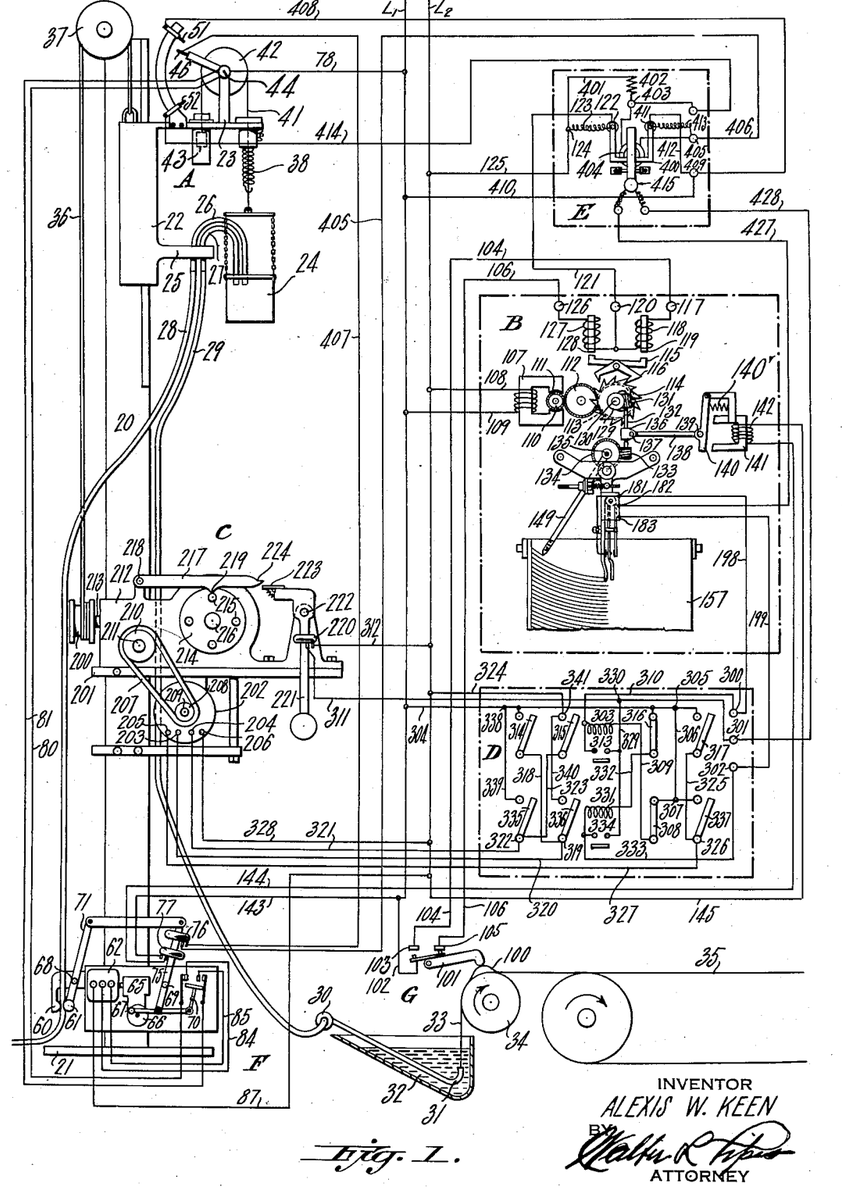
Figure 1 illustrates more or less diagrammatically the assembled thread making and control apparatus wired for operation.

Referring more particularly to Fig. 1 of the drawings, it will be seen that the main parts of the control apparatus for maintaining the size of rubber thread constant in the present embodiment of the invention are lettered A to G inclusive. Apparatus A together with motor operated pinch valve assembly F act as the weight measuring means to measure a fixed or definite weight of latex consumed in the thread making operation.

Apparatus B in conjunction with electrical contactor G measures the length of thread produced or the length of time elapsed during the consumption of such a fixed weight of latex, and also carries means for comparing such length produced with a predetermined standard length from such weight for production of the proper size thread. Motor lift assembly C provides the power means by which the hydrostatic head of the latex supply is adjusted upwardly or downwardly as required. Remote control reversing relay D controls the circuits which operate the motor lift assembly C. Holding relay E controls the circuits coordinating the timing of the weighing and length measuring operations of A and B.

*Latex weight measuring apparatus A and F*

Figures 2, 6:
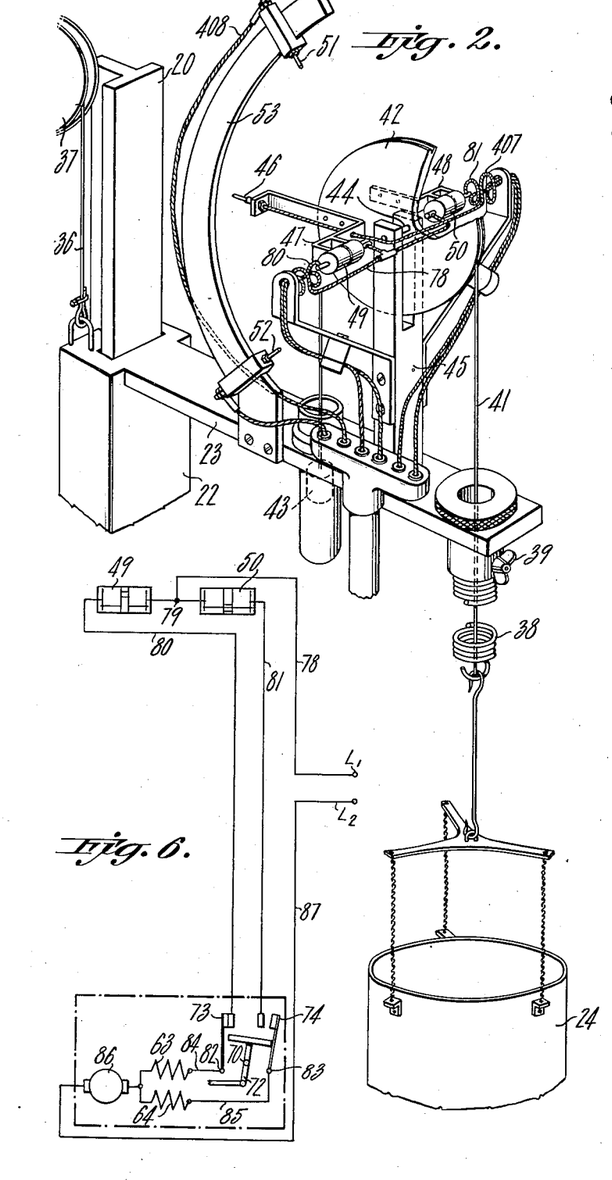
Fig. 2 is a perspective view of the apparatus A in Fig. 1 showing in general the construction and wiring.
Fig. 6 is a wiring diagram for the motor operated pinch valve mechanism F of Fig. 1.

At the upper end of column 20 on base or standard 21, as shown in detail in Fig. 2, is a slidably supported carriage 22 having an upper arm 23 from which is suspended a latex feed bucket 24 and on which is supported a control switch mechanism for operating the motor operated pinch valve assembly F to open and close the latex supply line at the proper times for filling the bucket. The carriage 22 also has a lower arm 25 to which two metal syphon tubes 26 and 27 are rigidly attached, one end of each of which dips just under the surface of the latex in the bucket 24. To the other end of syphon tube 26 is attached latex feed tube 28 and to the other end of syphon tube 27 is attached latex delivery tube 29, which delivers latex from the tank through a manifold 30 to a series of nozzles 31 dipped in a coagulant 32. The filamentary coagula 33 formed in the coagulant are withdrawn over a pull-roll 34 rotating at constant speed and thence onto a belt 35 travelling at constant speed to drying and other finishing operations. The pull-roll and belt may be traveling at the same surface speed or the belt may be traveling faster than the pull-roll to reduce the size of thread formed, in such case preferably with an intermediate stretching and annealing operation as shown in the patent to Joss No. 1,976,348 issued October 9, 1934. Carriage 22 is positioned on the support 20 by means of cable 36 connected at its top and passing over sheave 37 and wound around a drum 200 of the motor lift assembly C which, when it is necessary to make a correction in the hydrostatic head, raises or lowers the carriage 22 through a fixed limited distance at each energization as will be described more in detail below.

Figure 5:
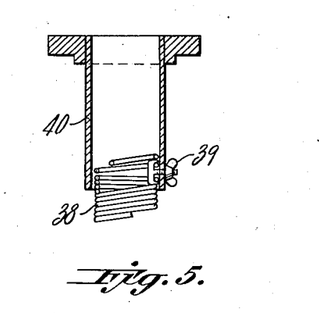
Fig. 5 is a section through the spring holding clamp shown in Fig. 2.

The latex bucket 24 is suspended from spring 38, the upper end of which is adjustably fixed to the upper arm 23 by means of a spring holding clamp 39 locking the spring end in an adjusting collar 40 set in the arm 23 by a beveled top or cap portion as shown in detail in Figs. 2 and 5. The length of the spring may be adjusted in collar 40 so that it is elongated one inch for each additional inch of latex in the bucket 24. With the spring so adjusted, although the bucket may empty and fill, the level of the latex stays constant, while the bucket moves up and down thus maintaining constant for a fixed position of the carriage 22 a constant hydrostatic head of latex at the nozzles 31. It will therefore be seen that when the construction just described is employed, for every inch increased in the depth of the liquid in the bucket 24 the bucket will move downwardly one inch, and that the weight of the liquid in the bucket at any time may be readily determined by measuring the height of the bucket with respect to its supporting means.

From the bucket 24, a silk line 41 rises through the spring 38 and collar 40 and is fastened at some point on the periphery of a pulley 42 which is pivoted for rotation at 44 near the top of upright support 45 on arm 23. The line continues on around the pulley to a counterweight 43. Secured to the flat surface of the pulley are a pointer 46 and clips 47 and 48 which latter locate two mercury switches 49 and 50 on the axis of the pulley. It can be seen that as the bucket 24 empties or fills, the pulley 42 will rotate counterclockwise or clockwise, and the pointer 46 will move down or up. The pointer 46 is arranged to touch two contacts 51 and 52 on quadrant 53 as it moves up or down respectively during filling or emptying of the bucket. The construction of the pointer 46 is such that it may wipe past the contacts 51 and 52 to momentarily close their electric circuits. The contacts 51 and 52 are adjustable along the quadrant 53, and serve to measure on the downward movement of the pointer 46 a fixed or definite weight of latex used in the thread making operation, the spring suspension 38 of the latex bucket 24 being used as a spring balance. The apparatus B compares this weight of latex with the length of thread made, or the time it takes to make such length of thread from such a weight of latex.

Figure 3:
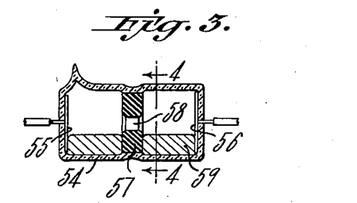
Fig. 3 is a front elevation showing details of one of the rotary mercury valves shown in Fig. 2.
Figure 4:
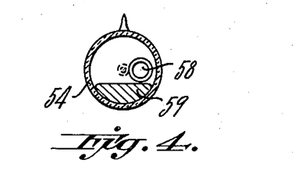
Fig. 4 is a section on the line 4—4 of Fig. 3.

The mercury switch 49 on the axis of pulley 42 serves to start the valve motor to open the latex feed valve through which the latex delivery tube 28 passes for filling the bucket 24, and the switch 50 on the same axis serves to start the valve motor to close the valve and pinch the tube when the bucket is full. The construction of these rotary mercury switches is shown in detail in Figs. 3 and 4, and is well known. The switch comprises a cylindrical shaped glass body 54 with electrodes 55 and 56 at each end. In the center of the switch is a dam or plug 57 of insulating material which has a small passage 58 through it positioned between the center and the circumference of the plug. As the valve rotates into a position where mercury 59, which only partly fills the switch, can pass through the passage 58, contact is made between electrodes 55 and 56 and when it rotates into a position where the mercury leaves the passage 58, the contact is broken. The switch 49 is mounted so that it will make contact and start the latex feed valve motor opening the valve when the pointer 46 is at some position below the contact 52 on the quadrant. Switch 50 is mounted to start the motor to close the valve at some position of the pointer above the contact 51. This is necessary so that no latex will be fed to the bucket 24 while the pointer 46 is touching or moving between contacts 51 and 52. The switches are constructed so that they maintain contact for a longer time than is necessary to open or close the valve and the valve motor is automatically stopped at the proper position of the valve by limit switches as described below.

Figure 7:
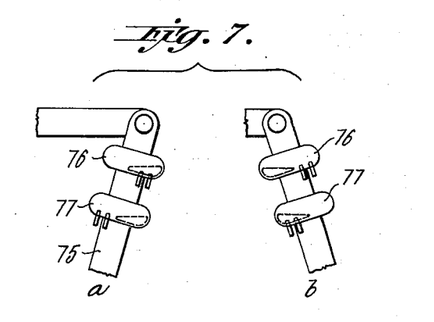
Figs. 7 to 11 illustrate the various positions of switches shown in Fig. 1.

The structure of the valve mechanism F located at the bottom of column 21 is shown in Fig. 1, and the wiring diagram for the valve motor assembly and the mercury switches 49 and 50 is shown in detail in Fig. 6. The latex feed tube 28 passes from a supply tank (not shown) between the stationary jaw 60 and the motor actuated cooperating pinch jaw 61 of the valve 60, 61 to the latex bucket 24. The double feed valve motor 62, which is started in one direction or the reverse direction by switch 49 or 50 making contact and energizing field 63 or 64 of the motor 62 (see Fig. 6), is connected through gear reduction box 65 to crank 66. The crank arm 67 on crank 66 operates a linkage pivoted at 68, 69 and 70, which acts through arm 71 to move the valve 61 to open or close the pinch valve, and through arm 72 to actuate limit switches 73 and 74 which place the motor 62 on open circuit after the valve has been opened or closed the proper distance subsequent to the closing of the pinch valve circuit through switch 49 or 50, and further through arm 75 to operate mercury switches 76 and 77 as shown in detail in Fig. 7 for purposes later to be described, the left hand figure of Fig. 7 showing the arm 75 when the pinch valve is closed and the right hand figure when the valve is open. As shown more particularly in Fig. 6, the circuit for opening and closing the latex valve 60, 61 extends from one line conductor $L_1$ through conductor 78, terminal 79, rotary mercury switch 49 or 50, whichever one is closed, conductor 80 or 81, limit switch 73 or 74 until opened mechanically by link 72, terminal 82 or 83, conductor 84 or 85, motor field 63 or 64, all depending on whether it is switch 49 or 50 which is closed, rotor 86 of motor 62, conductor 87 and to the other line conductor $L_2$.

*Thread length measuring apparatus B and G*

It has been seen how contacts 51 and 52 and pointer 46 of apparatus A measure a fixed weight of latex. The apparatus B in conjunction with electrical contactor G measures the length of thread produced from such a fixed weight of latex or the time it takes to consume such fixed weight of latex, and also carries means for comparing the measured length of thread with the correct or standard length of thread of the desired size which should be produced from such weight of latex.

The apparatus B more or less diagrammatically illustrated in Fig. 1, takes the form of a totalizing demand meter which with a pen gives a graphic record on a chart of the length of thread produced during the time it takes the pointer 46 of apparatus A to pass in its downward movement from contact 51 to contact 52. In order to compare the length of thread produced with the predetermined standard of length for the fixed weight of latex consumed, there is associated with the pen mechanism a contact apparatus as shown in detail in Figs. 12 and 13 which compares the length of thread actually produced from such a fixed weight of latex with the predetermined standard.

On pull-off roll 34 of the thread machine is a cam 100 which as it passes in rotation rocks the arm 101 of electrical contactor G so that the circuit from line conductor $L_1$ through conductor 102 is broken through contact 103 and conductor 104 and made through contact 105 and conductor 106. After the passage of cam 100, the contact 103 returns to closed position and the contact 105 to open position. The contactor G may be associated with a cam on a belt pulley instead of on the pull-off roll, if desired.

The totalizing demand meter B has a torque motor 107, the field of which is connected directly to the lines $L_1$ and $L_2$ through conductors 108 and 109. A torque is supplied through armature 110 of the motor and gear 111 on the armature through a train of gears 112 and 113 to an escapement wheel 114. An escapement arm 115, and escapement claw 116 are rocked by the alternate impulses of the electrical contactor G as follows.

During rotation of the pull-off roll 34 and, if the holding relay E is energized, while arm 101 is in contact with roll 34 and not the cam 100, the circuit for rocking the escapement claw extends from one line conductor $L_1$, through conductor 102, contact 103, conductor 104, terminal 117, coil 118 of magnet 119, terminal 120, conductor 121, contact 122 which is closed on energizing holding relay E as described below, pig-tail conductor 123 attached to the moving point of contact 122, terminal 124, conductor 125, and to the other line conductor $L_2$. When the cam 100 engages the arm 101, the circuit extends from line conductor $L_1$, through conductor 102, contact 105, conductor 106, terminal 126, coil 127 of magnet 128, terminal 120, conductor 121, contact 122 which is closed on energizing holding relay E as described below, pig-tail conductor 123, terminal 124, conductor 125 and to line conductor $L_2$.

The alternate impulses to the magnets 119 and 128 rock the arm 115 and escapement claw 116, and one tooth of the escapement wheel 114 advances at each double impulse as the cam 100 engages and releases the arm 101 of the contactor G. The rotation of the escapement wheel 114 is transmitted through a worm gear 129 on the common shaft 130 of gear 113 and the escapement wheel 114 to worm pinion 131 mounted on a shaft 132 to the other end of which is attached a second worm pinion 133 meshing with worm gear 134 which drives the pen arm shaft 135. The gear shaft 132 rotates in a collar 136 linked at 137 to an arm 138 which is linked at 139 to the armature 140 of a magnet 141. When the coil 142 of magnet 141 is energized, it pulls the worm pinion 133 out of mesh with worm gear 134, the shaft 132 being pivoted about the shaft 130, the worm gear 129 and pinion 131 not being unmeshed. When the worm pinion 133 is pulled out of mesh with worm gear 134, the pen arm is allowed to return to zero setting as described later. The coil 142 is energized to unmesh worm gear 134 and pinion 133 while the latex tank is being filled. At all other times spring 140' holds worm pinion 133 in mesh.

The circuit for energizing the coil 142 while the latex tank 24 is being filled extends from one line conductor $L_1$, through conductor 143, mercury switch 77 on arm 75 of the linkage attached to the motor operated valve 60, 61 which switch is closed while the pinch valve is opened (see position $b$ of Fig. 7), conductor 144, coil 142 of magnet 141, conductor 145, and to the other line conductor $L_2$. The mercury switch 77 is open, breaking the circuit energizing coil 142, while the pinch valve 60, 61 is closed.

Figure 12:
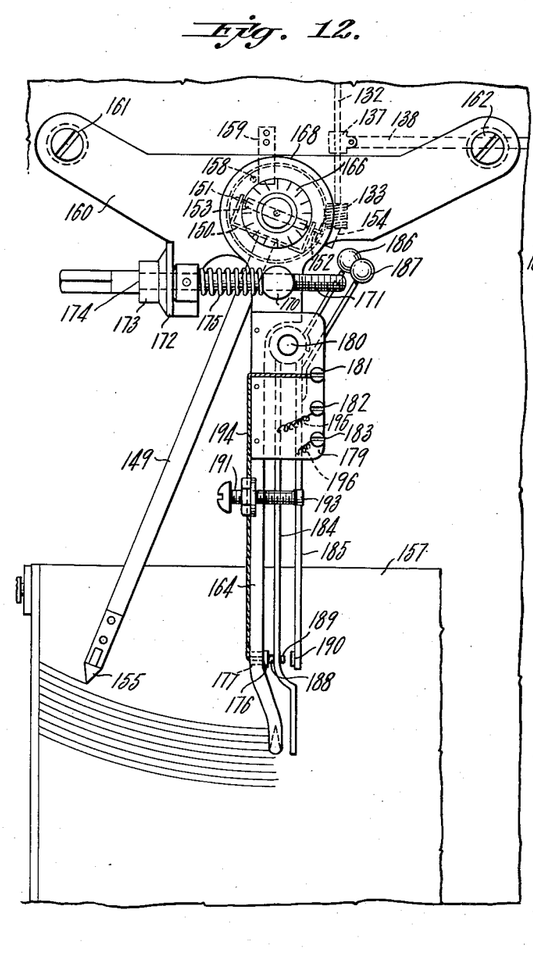
Figs. 12 and 13 are a front and side elevation respectively of the comparing means of apparatus B of Fig. 1.
Figure 13:
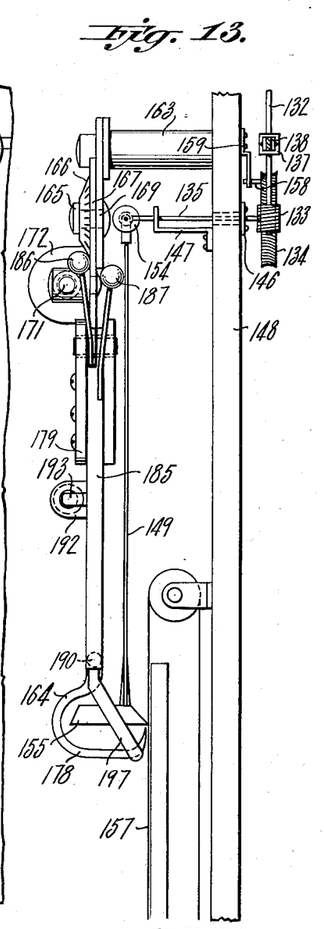

The pen mechanism and the contact mechanism for comparing with a standard the length of thread produced from the fixed weight of latex and graphically reproduced on a chart at the end of the pen stroke which was started by contact of pointer 46 with contact 51 and completed by contact of pointer 46 with contact 52, is shown in detail in Figs. 12 and 13.

The pen arm shaft 135 driven by the worm gear 134 when the worm pinion 133 is in mesh with the worm gear, rotates in bearings 146 and 147 attached to the face 148 of the meter B. At the end of shaft 135 remote from the worm 134 is suspended the pen arm 149 by means of a bracket 150 attached to the top of the pen arm and pivoted at 151 and 152 on the arm 153 which is secured normal to the shaft 135. The arm 153 beyond the point of suspension 152 of the bracket 159 supports a counterweight 154 for the pen arm 149 which tends to rotate the pen arm shaft 135 in a direction opposite to that imparted to the shaft by worm gear 134 and pinion 133. A pen 155 and reservoir are attached to arm 149 close to the pen point. This overbalances and provides sufficient pressure for the pen 155 against the chart 157 to give good inking. Attached to the face 148 of the instrument B adjacent the swing of the pen arm 149 is a chart 157 which is a time moved chart constantly fed by any clock mechanism or synchronous motor (not shown).

As the worm pinion 133 rotates the worm gear 134, the pen arm shaft 135 swings along the chart 157 as shown in Fig. 12. The pen arm is pivoted and suspended at the end of the shaft 135. The travel of the pen when measuring the length of thread produced from the fixed weight of latex is slow and the ink is fed from the pen by maintaining a capillary connection between the pen and paper as in usual practice with recording devices. When the pen arm gets to the end of its travel, that is when pointer 46 touches contact 52, the motor lift C, if necessary, is put in motion as hereafter described to raise or lower the head of latex. When the valve 60, 61 is opened, as described above, by means of mercury switch 49 and valve motor 62 at some position of the pointer 46 below the contact 52, as described above, the field 142 of magnet 141 is energized and the worm pinion 133 is unmeshed from worm gear 134. When this occurs the counterweight 154 on arm 153 tends to rotate the shaft 135 and swings the pen arm 149 back to zero position of the pen 155. The pen is stopped at zero position by a pin 158 on the face of worm gear 134, striking a stop bracket 159 attached to the back of the face 148 of the meter B. As the pen swings back to zero position, the rate of travel is so rapid that the capillary of ink from the pen 155 to the chart 157 is broken and no line is made. Since the chart is slowly and continuously advanced, as described above, the pen will return to a zero the desired distance above the zero for the previous measurement so that the chart will graphically show the actual length of thread from the fixed weight of latex as each measurement is made.

The mechanism for comparing the length of thread produced from the fixed weight of latex or the time it takes to produce such a length of thread is spaced in front of the face 148 of the instrument B adjacent the pen mechanism by means of a bracket 160 secured to the face 148 by screws 161 and 162, passing through spacers 163 and threaded into the face 148. A contact-carrying arm 164 is frictionally secured to the bracket 160 by means of a screw attachment 165 passing through a spring washer 166, a hole 167 in an enlarged rounded upper portion 168 of the arm 164, and a hole 169 near the center portion of the bracket 160. For adjustment of the arm 164 to the proper position, a stud 170 is rotatably secured to the upper portion 168 of the arm 164 below the hole 167. A screw 171 passes through a horizontal threaded hole in the stud 170 and through a flange 172 bent out at right angles from the bracket 160. Collar 173 fits between the flange 172 and a shoulder 174 on screw 171. An extension of screw 171 beyond the shoulder 174 is planed square for a key post for easy rotation of the screw 171. A spring 175 is placed between the flange 172 and the stud 170 to remove backlash. Rotation of the screw will set the arm 164 at the proper position. The arm 164 at the bottom portion carries a contact 176 insulated from the arm by an insulating plug 177. The bottom of the arm is hooked shaped as at 178 so that the end can be accurately set on the chart 157 and the pen 155 in its travel can swing through without touching it, since the arm 164 is fixed and not movable with the pen arm as it passes it.

Near the upper end of the arm 164 is attached an insulating bracket 179 in which is mounted a shaft 180 and terminals 181, 182 and 183. Freely rotating on the shaft 180 and insulated from the shaft and from each other are two contact arms 184 and 185. At the top portions of these arms are secured counterweights 186 and 187 respectively which act to rotate the arms towards the arm 164. To the bottom portion of arm 184 is secured a contact 188 which normally is forced to touch contact 176. On the other side of arm 184 is a contact 189 and opposite this contact on arm 185 is contact 190. Contacts 189 and 190 are normally kept apart by a spacing screw 191 attached to a flange 192 on arm 164 touching an insulated lug 193 on arm 185. The contact 176 is connected to terminal 181 through insulated conductor 194, and the contacts on arms 184 and 185 are connected to terminals 182 and 183 through pigtail conductors 195 and 196 respectively. The bottom of the arm 184 extends below the pen 155 at 197 so that as the pen travels through the hook 178 it will push the arm 184 before it, breaking the contact between 176 and 188, and as it travels further along will make contact between 189 and 190 and push arm 185 as well as 184 before it. The contact 190 may be set by screw 191 so that the distance between contacts 176 and 190 will correspond to any desired number of rotations of the cam 100 on pull-off roll 34. When the pen returns to zero as above described, the arms 184 and 185, if they have been pushed ahead by the pen as above described, are returned to normal position by counterweights 186 and 187.

*Motor lift assembly C*

Figure 8:
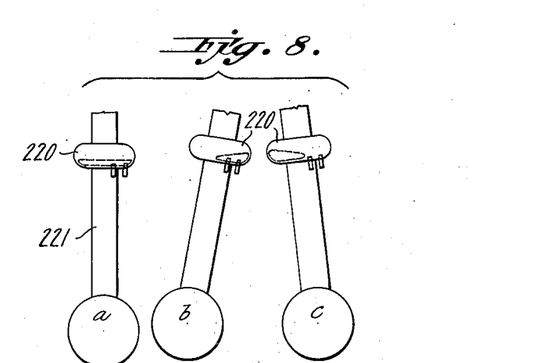

The adjustment of the hydrostatic head of latex is accomplished, as described above, by raising or lowering the carriage 22 through cable 36 wound around drum 200 of the motor lift assembly C. The motor lift assembly C is situated on a frame 201 secured to the column 20 above the pinch valve assembly F. Attached to the lower part of the frame 201 is a reversing motor 202 having terminals 203 and 204 for the starting directional winding and terminals 205 and 206 for the running winding of the motor. The motor through a belt 207 around the pulley 208 on the rotor shaft 209 and a pulley 210 on a gear shaft 211 drives a set of reduction gears (not shown) in gear box 212 situated on the upper portion of frame 201. The motor 202 transmits motion through the gear shaft 211 and reduction gear train to the shaft 213 of cable drum 200. A disc 214 with pins 215 on its face is mounted directly on one of the shafts 216 of the reduction gear train. A cam lever 217 is pivoted at 218 on the gear box 212 so that a cam 219 on its under side will be lifted by the pins 215 on rotation of the disc 214. This cam mechanism is used to stop the motor 202 after it has run a fixed interval in a direction either to raise or lower the carriage 22. The motor stop mechanism comprises a mercury switch 220 on a pendulum 221 pivoted at 222 and having a spring trigger 223 adjacent the free end 224 of the lever 217. When the motor 202 is ready for a correcting operation, the cam 219 is on a pin 215 and the cam lever 217 is raised so that the end 224 is above the trigger 223. The pendulum 221 is hanging vertical and the mercury switch 220 is positioned as in position a of Fig. 8. As the motor 202 runs in either direction, the disc 214 carrying pins 215 slowly turns and the cam lever 217 lowers and the free end 224 drops under spring trigger 223 with little if any movement of the pendulum, the contact in switch 220 not being broken. As the disc 214 turns and the next pin 215 in either direction engages the cam 219, the cam rises and the end 224 of the lever catches under spring trigger 223 and slowly swings the pendulum to the position shown in position b of Fig. 8, the switch 220 still making contact, until at the top of the movement of the lever the trigger slips off the end of the lever and the pendulum swings in an opposite direction as shown in position c of Fig. 8, breaking the contact in switch 220. The opening of the switch 220 interrupts the holding circuit of reversing relay D, as will be described later, and the motor running circuit is opened and the motor 202 stops. After the pendulum comes to rest, contact is again made across the terminals of the mercury switch 220 and the mechanism is again in position for the next operation.

The amount of correction of the head at each correcting operation is governed by the number of the pins 215 on the disc 214, the gear ratio of the reduction gear train, and the diameter of cable drum 200. It is most easily varied as desired by the number of pins 215. If the cable drum 200 is in the form of a cylinder, the amount of correction of the hydrostatic head will be a fixed quantity regardless of the head and, for relatively low heads for smaller sizes of thread, will be a proportionately greater correction than for relatively high heads for larger sizes of thread. The amount of correction may be made proportional to the hydrostatic head by making the cable drum 200 conical in shape so that at lower heights of the carriage 22 the cone-shaped drum will have a smaller diameter and less cable will be wound up or released at each correction operation and at greater heights of the carriage 22 the cone-shaped drum will have a larger diameter and more cable will be wound up or released at each correction operation.

Reversing relay D

The motor 202 is made to lower or raise the carriage 22 by a standard three pole remote control reversing relay D. The motor lowers the carriage 22 when the circuit across terminal 300 to terminal 301 is closed, and raises the carriage 22 when the circuit across terminal 301 to terminal 302 is closed. The circuits across terminals 300 and 301 or terminals 301 and 302 may be closed by the comparing means of the meter B acting through the control relay E, as is described below in the description of the control relay E and the operation of control mechanism.

When the circuit across terminal 300 to terminal 301 is closed, magnet coil 303 is energized by the circuit extending from one line conductor $L_1$ through conductor 304, terminal 305, conductor 306, terminal 307, switch 308, conductor 309, coil 303, conductor 310, terminal 300, across to terminal 301, through conductor 311, mercury switch 220, conductor 312 and to the other line conductor $L_2$. The circuit across switch 313 is closed by energization of the coil 303, and switches 314, 315, 316 and 317 are ganged together with switch 313, switches 314, 315 and 317 closing and switch 316 opening with the closing of switch 313. The switches 314 and 315 are in the motor directing circuit and switch 317 is in the motor running circuit. The motor 202 is started in the direction to lower the carriage 22 by the circuit extending from one line conductor $L_1$ through conductor 304, switch 314, conductor 318, terminal 319, conductor 320, terminal 203, the starting directional winding of the motor 202, terminal 204, conductor 321, terminal 322, conductor 323 switch 315, terminal 341, conductor 324, and to the other line conductor $L_2$. The running winding is simultaneously thrown in by closing the circuit extending from the one line conductor $L_1$, through conductor 304, switch 317, conductor 325, terminal 326, conductor 327, terminal 205, the running winding of the motor 202, terminal 206, conductor 328 and to the other line conductor $L_2$. The switch 313 acts to maintain the magnet coil 303 energized even though the circuit across terminals 300 to terminal 301 is closed only momentarily. Switch 313 holds the relay in until the main circuit is broken by mercury switch 220 which is in the holding circuit extending from one line conductor $L_1$ through conductor 304, terminal 305, conductor 306, terminal 307, switch 308, conductor 309, coil 303, switch 313, conductor 329, terminal 330, conductor 311, mercury switch 220, conductor 312 and to the other line conductor $L_2$.

When the circuit across terminal 301 to terminal 302 is closed, magnet coil 331 is energized by the circuit extending from one line conductor $L_1$ through conductor 304, switch 316, conductor 332, coil 331, conductor 333, terminal 302, across to terminal 301, through conductor 311, mercury switch 220, conductor 312 and to the other line conductor $L_2$. The switch 334 is closed by energization of the coil 331, and switches 335, 336, 308 and 337 are ganged together with switch 334, switches 335, 336 and 337 closing and switch 308 opening with the closing of switch 334. The switches 335 and 336 are in the motor directing circuit and switch 337 is in the motor running circuit. The motor 202 is started in the direction to raise the carriage 22 by the circuit extending from one line circuit $L_1$ through conductor 304, terminal 338, conductor 339, switch 335, terminal 322, conductor 321, terminal 204, the starting directional winding of the motor 202, terminal 203, conductor 320, terminal 319, switch 336, conductor 340, terminal 341, conductor 324 and to the other line conductor $L_2$. The running winding is simultaneously thrown in by closing the circuit extending from one line conductor $L_1$ through conductor 304, terminal 305, conductor 306, terminal 307, switch 337, terminal 326, conductor 327, terminal 205, running winding of the motor 202, terminal 206, conductor 328 and to the other line terminal $L_2$. The switch 334 acts to maintain the magnet coil 331 energized even though the circuit across terminal 301 to terminal 302 is closed only momentarily. Switch 334 holds the relay in until the main circuit is broken by mercury switch 220, which is in the holding circuit extending from one line conductor $L_1$ through conductor 304, switch 316, conductor 332, coil 331, holding contact 334, conductor 329, terminal 330, conductor 311, mercury switch 220, conductor 312 and to the other line conductor $L_2$.

Switches 316 and 308 are normally closed and are reverse acting for protection against simultaneous energizing of coils 303 and 331, switch 316 opening on energization of coil 303 and switch 308 opening on energization of coil 331.

The mercury switch 220 is in the main circuit to both coils 303 and 331 and the breaking of the circuit by the mercury switch by the swinging of the pendulum 221 as above described interrupts the main circuit, open-circuits either the magnet coil 303 or 331, releases the associated switches in the motor directing circuit and motor running circuit, and stops the motor 202.

Control relay E

As discussed above in the description of apparatus B and G, the escapement claw 116 is rocked by the alternate impulses of the contactor G when the contact 122 on the relay switch 400 is closed. The pen 155 on the instrument B records the total impulses of the contactor G occurring between the contact of pointer 46 of apparatus A with contacts 51 and 52 on the downward path of the pointer. The arc described by the pen is thus a measure of the length of thread produced or of the time it takes such length of thread to be produced from a fixed weight of latex corresponding to the weight used up while the pointer 46 descends from contact 51 to contact 52. The closing and opening of contact 122 is made responsive to the touching of contacts 51 and 52 by the pointer 46 by means of relay 400. The mercury switch 76 in the line from the pointer to the relay makes the contact 122 responsive to the touching of contact 51 by pointer 46 only on the downward path of the pointer, that is, while the tank 24 is emptying, since in only the tank emptying operation is the switch closed as shown in position a of Fig. 7.

The circuit for closing the relay 400 when the pointer 46 touches contact 51 while the tank 24 is emptying, extends from one line conductor L₂ through conductor 125, terminal 124, conductor 401, resistance 402, terminal 403, coil 404, terminal 405, conductor 406, mercury switch 76, conductor 407, contact of pointer 46 with contact 51, conductor 408, terminal 409, conductor 410, and to the other line conductor L₁. While the tank 24 is filling, the latex valve 60, 61 will be open and the mercury switch 76 will be open as shown in position b of Fig. 7, hence the relay will not respond to the pointer 46 touching the contact 51 in its upward motion.

The contact 411 on the relay acts as a holding contact to keep the relay 400 closed once the magnet coil 404 is energized by pointer 46 touching contact 51. The holding circuit extends from one line conductor L₁ through conductor 410, terminal 409, conductor 412, contact 411, pigtail conductor 413, terminal 405, coil 404, terminal 403, resistance 402, conductor 401, terminal 124, conductor 125 and to the other line terminal L₂.

The relay 400 remains closed until the pointer 46 touches the contact 52 closing the circuit extending from terminal 405 of the coil 404 through conductor 406, mercury switch 76, conductor 407, contact of pointer 46 with contact 52, conductor 414, and other terminal 403 of the coil 404, thus short circuiting the coil 404 and opening the relay 400, which in turn opens switch 411, breaking the holding circuit.

The opening of the relay 400 breaks the contacts 122 and 411 in the length measuring circuit and the holding circuit. In addition, the opening of relay 400 closes for a short interval the circuit across the electrodes of a one-way acting mercury switch 415 which throws into action the corrective circuits for the motor lift C which are controlled by the position of the contacts 176, 188, 189 and 190 on the comparing mechanism of the instrument B at the end of the swing of the totalizing pen 155.

Figures 9, 10, 11:
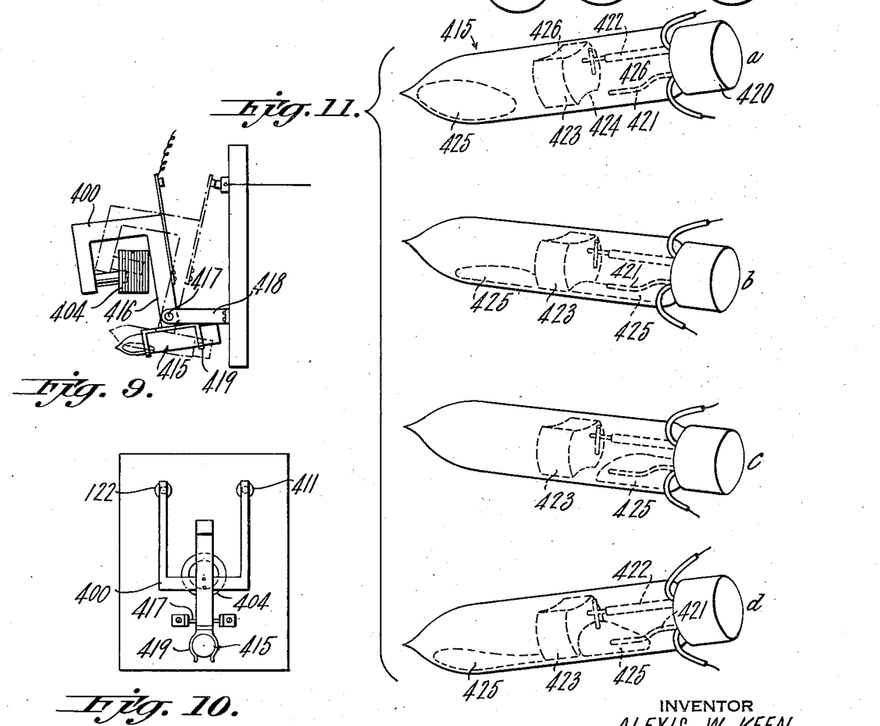

The construction and action of the one-way acting switch 415 and the positioning of the same on the relay 400 is shown in detail in Figs. 9 to 11. A swinging frame portion 416 of the relay 400 is pivotally mounted at 417 on the arm 418 affixed to the relay box. To the bottom of frame 416 is attached a switch clip 419 which holds the mercury switch 415. The switch comprises a glass container and an insulating base 420 through which extend electrodes 421 and 422 connected to conventional lead-in wires. An insulating barrier 423 is disposed intermediate the length of the container with a passageway 424 formed in the bottom thereof for the passage therethrough of a body of mercury 425 and a passageway 426 formed in the top of the barrier for the passage of gases. The electrode 421 extends along the bottom of the container towards the barrier and electrode 422 extends toward the barrier well above the bottom of the container and preferably has a short end portion depending towards the electrode 421. The switch clip 419 is attached to the relay frame 416 so that when the coil 404 is de-energized and the relay is open, the switch 415 will be in open position as shown in position a of Fig. 11. It is, of course, desired to start the correcting circuits for the motor lift C only when the relay 400 is opened from closed position when the pointer 46 touches the contact 52 and this is accomplished as shown in Fig. 11. As shown in position a of Fig. 11, when the relay is open as when the tank is filling and until the pointer 46 touches contact 51, the pool of mercury 425 will be out of contact with the electrodes 421 and 422. When the relay is closed the mercury switch goes into position b and the mercury begins to trickle through the passage 424, the gas pressure being equalized through passage 426. The mercury contacts only the electrode 421 even after it has all trickled into the base portion of the container as shown in position c and hence no circuit has been made across the electrodes 421 and 422 by the closing motion of the relay. When the relay opens the tube tilts into position d and the pool of mercury hits the barrier 423, completing the circuit across electrode 421 and the tip of electrode 422. This closing of the circuit across the electrodes 421 and 422 is only for a short interval of time since the mercury flows into the head portion of the switch and the circuit across the electrodes becomes broken as shown in position a.

As discussed above in the description of the reversing relay D, the motor 202 lowers the carriage 22 when the circuit across terminals 300 and 301 of relay D is closed, and raises the carriage 22 when the circuit across terminals 301 and 302 is closed. The one-way acting switch 415 is in both circuits from the common terminal 301 to terminals 300 and 302 so that no circuit can be made across terminals 300 to 301 or 301 to 302 to move the carriage 22, if such correction is necessary, except when the relay 400 is opened by contact of the pointer 46 with contact 52, and then only for a short period. The terminal 182 for the contacts 188 and 189 of the comparing mechanism of the instrument B is connected to terminal 301 of the reversing relay D through the one way acting mercury switch 415 through conductors 427 and 428, and the terminals 181 and 183 of contacts 176 and 190 of instrument B are connected directly to terminals 300 and 302 by conductors 198 and 199 respectively. The circuit across terminals 300 to 301 or terminals 301 to 302 of relay D may thus be closed only through the comparing means of the instrument B and then only if the one-way acting mercury switch 415 is closed.

*Operation of the control mechanism*

From Figs. 12 and 13 it may be seen that once the point of hook 178 on the fixed arm 164 of the comparing mechanism is set on the chart at the proper position corresponding to the predetermined standard of length of thread for the fixed quantity of latex used, the arm 184 will be pushed by the pen a sufficient distance to center the contacts 188 and 189 between contacts 176 and 190 without touching either, when the actual length of thread produced is equal to the predetermined standard, and any deviation from that standard will allow contacts 176 and 188 to remain closed if the length of thread is short of the standard, or will force contact 189 to touch contact 190 if the length of thread produced is greater than the standard. The permissible deviation of the length of thread from the standard for a given weight of latex without making a head correction may be regulated by adjusting the distance between the contacts 176 and 190. A simple calculation will give the correct setting for the control contacts.

Let $W$ = the weight of latex delivered between contacts 51 and 52.
Let $w$ = the weight of latex per unit strength desired.

The total length $L$ which the measured weight $W$ should produce may then be expressed as $$L = \frac{W}{w}$$

This $L$ can easily be set on a calibrated chart by the point of the hook 178 of the fixed arm 164.

The rotary mercury switch 49 is set so that the latex valve 60, 61 opens when the pointer 46 is below the contact 52 and before the bottom of tank 24 contacts the bottom of syphon tube 27, which syphon tube together with the feed tube 28 is filled at the beginning of the thread making operation. The switch 50 is set so that the latex valve 60, 61 closes when the pointer 46 is above the contact 51 and before the tank 24 overflows.

The contacts 51 and 52 are set so that the pen 155 will swing a convenient distance on the chart 157 as the pointer 46 travels between contacts 51 and 52.

The fixed arm 164 of the comparing mechanism of apparatus B is set as above described at the position where the pen 155 will move the arm 184 so that the contacts 188 and 189 are equidistant from contacts 176 and 190 when the predetermined standard length of thread for the fixed weight of latex has been measured. The distance between contacts 176 and 190 is regulated by the screw 191 as above described to give the desired permissible variation of thread produced from the predetermined standard without making a correction in hydrostatic head of latex.

The interconnected apparatus as shown in Fig. 1 functions as an automatic control while the latex is fed continuously to the nozzles 31 from the latex tank 24 which is intermittently supplied with latex through the valve 60, 61. The head of latex on the nozzles is maintained constant for any setting of the carriage 22 by the spring 38.

When the bucket 24 has emptied the desired amount at some position of the pointer 46 below the contact 52, the rotary switch 49 closes and the bucket is filled by the opening of the latex valve 60, 61 through completion of the valve-opening motor circuit $L_1$, 78, 79, 49, 80, 73, 82, 84, 63, 86, 87, $L_2$. The limit switch 73 breaks the motor circuit when the valve 60, 61 has opened the proper distance.

The opening of the latex valve closes the switch 77 on the linkage arm 75 which disengages the worm pinion 133 from the worm gear 134 and allows the pen 155 through the action of counterweight 154 to return to zero position by energizing the coil 142 of magnet 141 in circuit with the closed switch 77 through the circuit $L_1$, 143, 77, 144, 142, 145, $L_2$.

The opening of the latex valve also opens switch 76 on the linkage arm 75 which throws the relay 400 out of circuit for the duration of the bucket filling operation, so that relay 400 is not closed by contact of pointer 46 with contact 51 on the upward swing of the pointer.

Open contact 122 on relay 400 prevents the impulses from contactor G being transmitted to the escapement claw 116.

When the bucket 24 is filled the desired amount at some position of the pointer 46 above the contact 51, the rotary switch 50 closes and the bucket starts emptying by the closing of the latex valve 60, 61 through completion of the valve-closing motor circuit $L_1$, 78, 79, 50, 81, 74, 83, 85, 64, 86, 87, $L_2$. The limit switch 74 breaks the motor circuit when the valve 60, 61 has closed the proper distance to cut off the latex feed through feed tube 28.

The closing of the latex valve closes switch 76 on the linkage arm 75 which throws the pointer 46 into circuit.

The closing of the latex valve also opens the switch 77 on the linkage arm 75, which open-circuits coil 142 of magnet 141 thus allowing the worm pinion 133 to engage the worm gear 134 at the zero position of the pen 155, by breaking the circuit $L_1$, 143, 77, 144, 142, 145, $L_2$.

As the pointer 46 touches the contact 51 in its downward movement, the relay 400 is closed through the circuit $L_2$, 125, 124, 401, 402, 403, 404, 405, 406, 76, 407, 46, 51, 408, 409, 410, $L_1$.

The contact 411 on the relay acts as a holding contact to keep the relay closed after the pointer 46 has passed the contact 51 through the circuit $L_1$, 410, 409, 412, 411, 413, 405, 404, 403, 402, 401, 124, 125, $L_2$.

The contact 122 on the relay 400 completes the circuit $L_1$, 102, 103, 104, 117, 118, 119, 120, 121, 122, 123, 124, 125, $L_2$, for rocking the escapement claw 116 and totalizing the revolutions of the pull roll 34 by the pen 155.

On closing the relay 400, the one-way acting switch 415 maintains an open circuit by going through the positions shown in *a*, *b*, and *c* of Fig. 11 and prevents the circuit being closed across terminals 300 and 301 or 301 and 302 of reversing relay D.

When the pointer 46 in its downward movement touches the contact 52, the relay 400 is opened by the short circuiting of the coil 404 of the relay magnet through the circuit 405, 406, 76, 407, 46, 52, 414, 403. The breaking of holding contact 411 opens the holding circuit for the relay and the breaking of contact 122 opens the circuit from the contactor G to the magnets 119 and 128 of the escapement arm 115, thereby preventing any further impulses from the contactor G being transmitted to the escapement claw 116 and stopping the movement of the pen 155. At this stop position the position of pen 155 indicates the length of thread produced from the fixed weight of latex used.

The opening of the relay 400 closes the one-way acting switch 415 for a very short period of time, as shown in position d of Fig. 11. The closing of this switch permits the comparing mechanism of the instrument B and the reversing relay D to raise or lower the carriage 22 through the motor lift C, if such correction is necessary.

Since the contact arm 164 has been set as above described at the proper position for comparing the length of thread produced with a predetermined standard, three positions of the pen in relation to the control contacts 176, 188, 189 and 190 are possible at the end of its stroke, on the opening of relay 400 and the simultaneous closing of the one-way acting switch 415 as shown in position d of Fig. 11.

If the pen 155 has not moved the arm 184 away from the arm 164 of the comparing mechanism and the contacts 176 and 188 remain touching, signifying that the length of thread produced from the fixed weight of latex is less than the standard and hence the filament is larger than desired, then the circuit across terminal 300 to terminal 301 of the reversing relay D is closed through the circuit extending from terminal 300 through conductor 198, terminal 181, conductor 194, contact 176, contact 188, arm 184, conductor 195, terminal 182, conductor 427, one-way acting switch 415, conductor 428, and to terminal 301. By thus momentarily completing the circuit from terminal 300 to terminal 301, the motor 202 is started in the direction to lower the carriage 22 as described above under the heading of "Reversing relay D".

If the pen 155 has moved the arm 184 away from the arm 164 a sufficient distance so that contact 188 is no longer touching contact 176 and only such a distance that contact 189 is not touching contact 190, then the length of thread produced from the fixed weight of latex is within the permissible limits of variation from the predetermined standard and the circuits across terminal 300 to 301 and across terminal 301 to terminal 302 remain open and no correction of the carriage 22 is made.

If pen 155 has moved the arm 184 away from the arm 164 a sufficient distance so that contact 188 has moved away from contact 176 and contact 189 touches contact 190, signifying that the length of thread produced from the fixed weight of latex is greater than the standard and hence the filament is smaller than desired, then the circuit across terminal 301 to terminal 302 is closed through the circuit extending from terminal 301 through conductor 428, one-way acting switch 415, conductor 427, terminal 182, conductor 195, arm 184, contact 189, contact 190, arm 185, conductor 196, terminal 183, conductor 199, terminal 302. By thus momentarily completing the circuit across the terminal 301 to terminal 302, the motor 202 is started in the direction to raise the carriage 22 as described above under the heading of "Reversing relay D".

The lines on the chart 157 give a permanent record of each measurement of the length of thread produced from the fixed weight of latex.

If a correction is made to raise or lower the carriage 22, the motor 202 is automatically stopped by the momentary breaking of the circuit through the mercury switch 220 by the swinging of the pendulum 221 after the disc 214 has rotated the distance between two pins 215 also as described above under the heading of "Motor lift assembly C". When the pointer 46 has passed the contact 52 to the position where the bucket is again filled with latex, the rotary switch 49 closes and the bucket is filled by the opening of the latex valve 60, 61 through completion of the valve opening motor circuit $L_1$, 78, 79, 49, 80, 73, 82, 84, 63, 86, 87, $L_2$, the limit switch 73 breaking the motor circuit when the valve 60, 61 has opened a proper distance.

In view of the many changes and modifications that may be made without departing from the principles underlying the invention, reference should be made to the appended claims for an understanding of the scope of the invention.

Having thus described my invention, what I claim and desire to protect by Letters Patent is:

1. In an apparatus for making rubber thread by flowing latex under a hydrostatic head through an orifice, means for maintaining substantially constant the size of thread produced comprising, means for compensating for loss of hydrostatic head due to the consumption of latex, means for comparing a fixed weight of latex consumed with the length of thread produced from such a weight of latex, and means controlled by said comparing means for adjusting said hydrostatic head to at least in part counter-balance variations in the length of thread produced from such a weight of latex.

2. In an apparatus for making rubber thread from latex, means for extruding latex under a substantially constant hydrostatic head, means for weighing a charge of latex and for measuring the length of thread produced therefrom, means for varying the hydrostatic head on the latex, and means responsive to variations in the ratio between said weight and length for automatically controlling the operation of said last named means whereby to produce rubber thread substantially constant in cross section.

3. In an apparatus for making rubber thread from latex, means for extruding latex under a substantially constant hydrostatic head, means for varying the hydrostatic head on the latex, and means including a device for comparing the weight of rubber latex supplied for extrusion with the length of the rubber thread being simultaneously produced and adapted to automatically control the operation of the means for varying the hydrostatic head to thereby produce rubber thread substantially constant in cross section.

4. In an apparatus for making rubber-containing articles of continuous length by flowing of latex, means for maintaining substantially constant the size of article produced comprising, means for periodically comparing a fixed weight of latex consumed with the length of article produced from such a weight of latex, and means controlled by said comparing means for adjusting the actual flow of the latex to at least in part counterbalance variations in the length of article produced from such a weight of latex.

5. In an apparatus for making rubber-containing articles of continuous length by flowing of latex, means for maintaining substantially constant the size of article produced comprising, electro-responsive means for determining the rate at which the latex is consumed, means for comparing the size of article produced with the rate of consumption of latex, and means controlled by said comparing means for adjusting the actual flow of the latex to at least in part counterbalance variations in size of the article produced.

6. In an apparatus for making articles of continuous length by the flowing of a fluid material which is subject to changes in property which act to vary the flow characteristics of the material, means for maintaining substantially constant the size of the article produced comprising, electro-responsive means for determining the rate at which the fluid material is consumed, means for measuring the rate of production of the article relative to the rate of consumption of the material and means controlled by said measuring means for adjusting the ratio of said rate of production to said rate of consumption to at least in part correct variations therein from a predetermined standard.

7. In an apparatus for making articles of continuous length by the flowing of a fluid material which is subject to changes in property which act to vary the flow characteristics of the material, means for maintaining substantially constant the size of the article produced comprising, means for periodically determining a fixed weight of the material consumed and comparing this weight with the length of article produced from such a weight of material, and means controlled by said comparing means for adjusting the actual flow of the material to at least in part counterbalance variations in the length of article produced from such a weight of material.

8. In an apparatus for making articles of continuous length by the effluence under pressure of a fluid material which is subject to changes in property which act to vary the flow characteristics of the material, means for maintaining substantially constant the size of the article produced comprising, means for periodically comparing a fixed weight of the material consumed with the length of article produced from such a weight of material, and means controlled by said comparing means for adjusting the pressure of the fluid material at the point of effluence to at least in part counterbalance variations in the length of article produced from such a weight of material.

9. In an apparatus for controlling the flow of a fluid material, a weight-measuring mechanism, a time-measuring mechanism, and means coordinating said weight-measuring and time-measuring mechanisms for determining the rate of flow of the fluid.

10. In an apparatus for controlling the flow of a fluid material, a weight-measuring mechanism, a time-measuring mechanism, means coordinating said weight-measuring and time-measuring mechanisms for determining the rate of flow of the fluid, and means associated with said coordinating means for controlling the flow of said fluid.

11. In an apparatus for controlling the flow of a fluid material, a weight-measuring mechanism, a time-measuring mechanism, means coordinating said weight-measuring and time-measuring mechanisms for determining the rate of flow of the fluid, and means associated with said coordinating means for maintaining substantially constant the flow of said fluid.

12. In an apparatus for controlling the flow of a fluid material, means for measuring a fixed weight of fluid supplied, means for measuring the time elapsed in supplying said fixed weight of fluid, and means coordinating the weight-measuring and time-measuring means for determining the rate of flow of the fluid.

13. In an apparatus for controlling the flow of a fluid material, means for measuring a fixed weight of fluid supplied, means for measuring the time elapsed in supplying said fixed weight of fluid, means coordinating the weight-measuring and time-measuring means for determining the rate of flow of the fluid, and means associated with said coordinating means for controlling the flow of said fluid.

14. In an apparatus for controlling the flow of a fluid material, means for measuring a fixed weight of fluid supplied, means for measuring the time elapsed in supplying said fixed weight of fluid, means coordinating the weight-measuring and time-measuring means for determining the rate of flow of the fluid, and means associated with said coordinating means for maintaining substantially constant the flow of said fluid.

15. In the process of making articles by flowing a fluid material which is subject to changes in property which act to vary the flow characteristics of the material, the steps comprising weighing a charge of the fluid material, measuring the length of article produced therefrom, and automatically counterbalancing changes in the ratio between said weight and length to maintain constant the form of the articles produced.

16. In the process of making articles by flowing a fluid material which is subject to changes in property which act to vary the flow characteristics of the material, the steps comprising weighing a charge of the fluid material, measuring the length of article produced therefrom, and automatically adjusting the actual flow of the material to correct variations in the ratio between said weight and length to thereby correct variations in the form of the articles produced.

17. In an apparatus for making rubber thread, means for streaming latex through an orifice, a latex weighing receptacle having means for supplying latex thereto, electro-responsive devices positioned to be operated when the receptacle has been filled to a predetermined amount and emptied to a predetermined amount to thereby determine the charge, means for measuring the length of thread produced from said charge, and means responsive to variations in said measured length from a standard length and operable automatically to change the flow of latex to correct such variations.

18. In an apparatus for making rubber thread, means for streaming latex through an orifice, a latex weighing receptacle having means for supplying latex thereto, means adapted to be operated when a predetermined charge has been consumed from said receptacle in the formation of thread, means for measuring the length of thread produced from said charge, and means responsive to variations in said measured length from a standard length and operable automatically to change the flow of latex to correct such variation.

ALEXIS W. KEEN.